July 23, 1929.  T. F. SEXTON  1,722,159
LATCH LINK FOR CHAINS
Filed Feb. 18, 1929
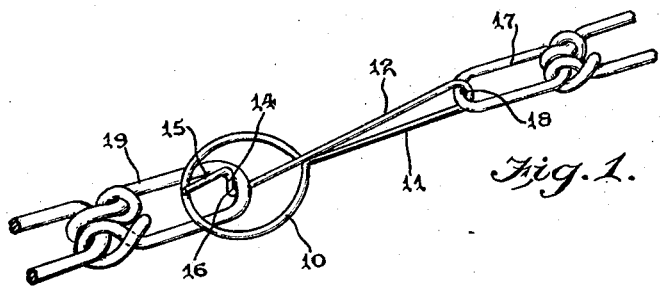
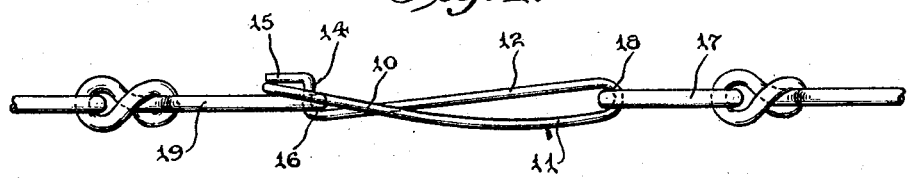
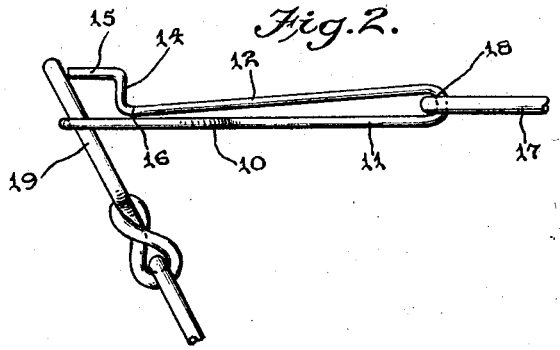
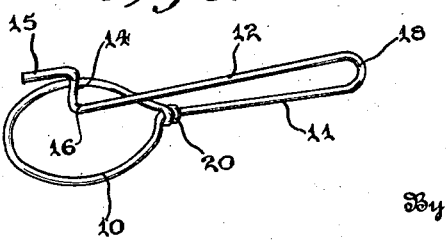
Inventor
Thomas F. Sexton,
By
Attorney Patented July 23, 1929.

1,722,159

UNITED STATES PATENT OFFICE.

THOMAS F. SEXTON, OF BALTIMORE, MARYLAND.

LATCH LINK FOR CHAINS.

Application filed February 18, 1929. Serial No. 340,812.

The object of the invention is to provide a combined hook and link which may be used as an element for connecting the terminal links of a chain which will effectively retain the links in latched position so that there may be no opportunity of their accidental displacement or disengagement, such as the runner or cross chains of a tire nonskid device, or as a means for effectively latching the terminals of two chains together without the possibility of accidental disengagement, where the chains are used for traction purposes and the like; to provide a latch link constructed out of a single piece of metal so that all of the cooperating elements may be integral; and to provide a device of this character which is of simple form and susceptible of cheap manufacture and low marketing cost.

With this object in view the invention consists in a construction and combination of parts of which a preferred embodiment is illustrated in the accompanying drawings, wherein:

Figure 1 is a perspective view showing the invention employed as a connecting element between the extremities of two chains.

Figure 2 is an edge elevational view of the link, showing the initial position of the chain link preparatory to effecting the latch position.

Figure 3 is an enlarged perspective view of the invention.

Figure 4 is a view similar to Fig. 2 but showing the latched position of the link and chain.

The link constituting the invention comprises an eye 10 from the periphery of which extends a radial shank 11 the material from which it is formed being bent back on itself to provide a shank 12 paralleling the shank 11 but lying in a plane parallel to the plane of the eye 10, over the center of which it is bent upwardly as indicated at 14 and then bent again into a plane parallel with the plane of the eye as indicated at 15. The upwardly extending portion 14 is at a slight acute angle to the shank 12 and at the joint connecting the two a throat 16 is formed which lies slightly to one side of the center of the eye 10 but directly opposite the point of connection of the shank 11 with the latter. The terminal portion 15 ends in a plane to which the eye 10 is tangent, or slightly beyond that plane.

The shanks 11 and 12 are spaced apart a distance equal to or slightly greater than the cross-sectional diameter of the chain link 17 and the bent portion of the material constitutes a seat 18 for said link 17, just as the throat 16 constitutes a seat for the link 19 which may be one terminal of the chain of which the link 17 is the other, or the terminal link of a separate chain which is to be connected to the first.

The link 19 extends through the eye 10 and lies against the side surface of the eye on the opposite side from the shank 12 and, lying in the throat 16, is effectively latched or secured to the link constituting the invention.

The attaching operation consists in inserting the link 19 through the eye 10 and then swinging it over the hook formed by the terminal 15 and bent portion 14, when it seats in the throat 16. The terminal portion 15 serves as a keeper to prevent accidental displacement of the link in the event of slack in the connected chain, since it extends radially across the eye in the opposite direction from which the shank 12 extends from the throat 16.

The latch link constituting the invention is formed from a single strand of wire, or metal rod and where the bend constituting the eye is formed, the free extremity is welded to the shank 11 at its point of juncture to the eye, in the case of heavy material preferably, or is twisted around the shank 11 as indicated at 20 in Figure 3.

The invention having been described what is claimed as new and useful is:

1. A link of the kind indicated formed from a single strand of wire bent to provide an eye and parallel shank portions lying in a plane parallel to the plane of the eye, one of the shank portions being connected with the eye and the other extending diametrically across the same and formed to provide a hook for engagement with a link extending through the eye, the hook being formed by offsetting the extremity of the connected shank to provide a link chain seat and a free terminal extending to the periphery of the eye.

2. A link of the kind indicated formed from a single strand of wire bent to provide an eye and parallel shank portions lying in a plane parallel to the plane of the eye, one of the shank portions being connected with the eye and the other extending diametrically across the same and formed to provide a hook for engagement with a link extending through the eye, the hook being formed by offsetting the extremity of the connected shank to provide a link chain seat and a free terminal extending to the periphery of the eye, said free terminal lying in the plane common to the plane of the two shanks.

3. A link of the kind indicated formed from a single strand of wire bent to provide an eye and parallel shank portions lying in a plane parallel to the plane of the eye, one of the shank portions being connected with the eye and the other extending diametrically across the same and formed to provide a hook for engagement with a link extending through the eye, the hook being formed by offsetting the extremity of the connected shank to provide a link chain seat and a free terminal extending to the periphery of the eye, said free terminal lying in the plane common to the plane of the two shanks.

In testimony whereof he affixes his signature.

THOMAS F. SEXTON.